Nov. 23, 1937.   R. MOORE   2,100,144
CONVEYER PROPELLED SUPPLY TRUCK FOR USE WITH SHAKING CONVEYERS
Filed April 4, 1936   3 Sheets-Sheet 1
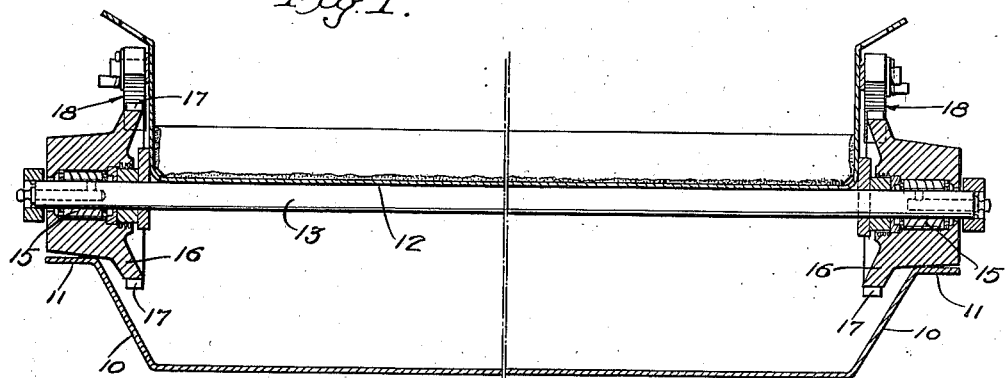
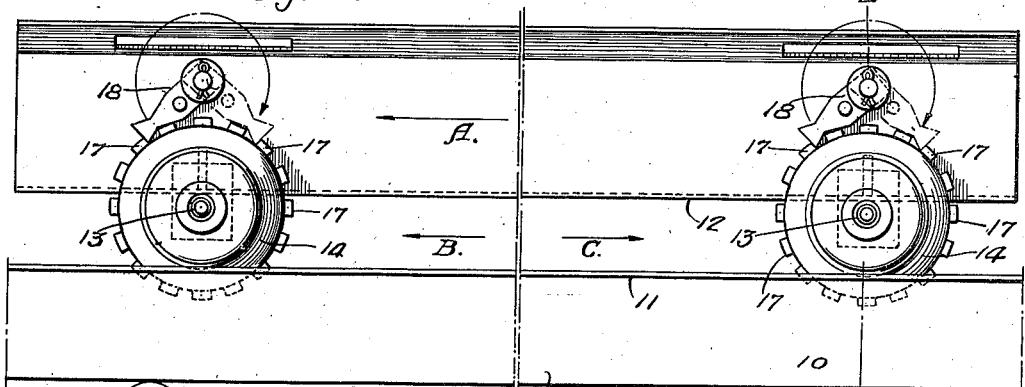
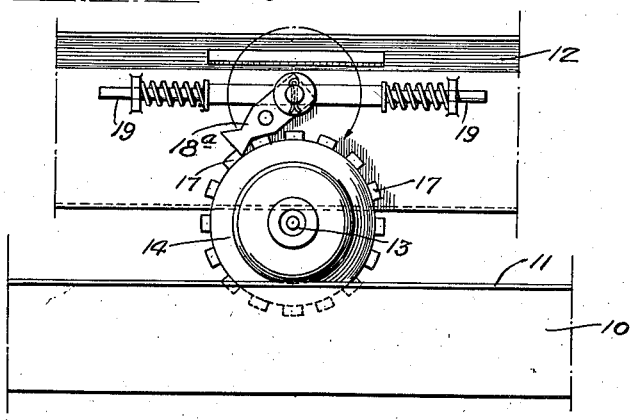
Inventor:—
Roscoe Moore
by his Attorneys
Howson & Howson Nov. 23, 1937. R. MOORE 2,100,144
CONVEYER PROPELLED SUPPLY TRUCK FOR USE WITH SHAKING CONVEYERS
Filed April 4, 1936 3 Sheets-Sheet 2
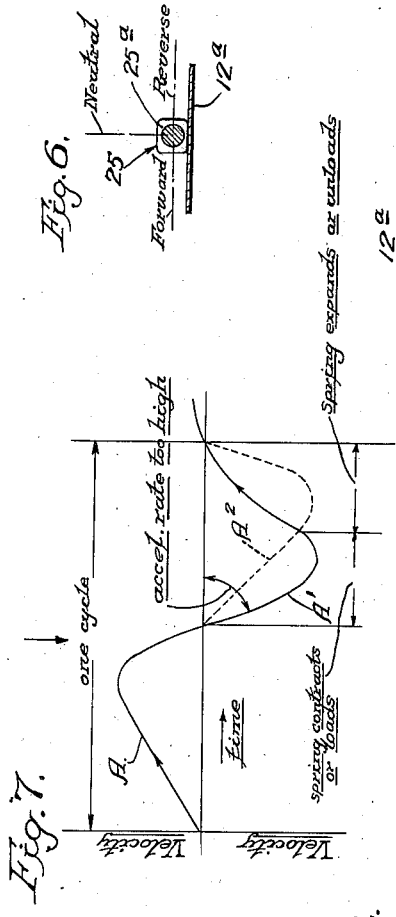
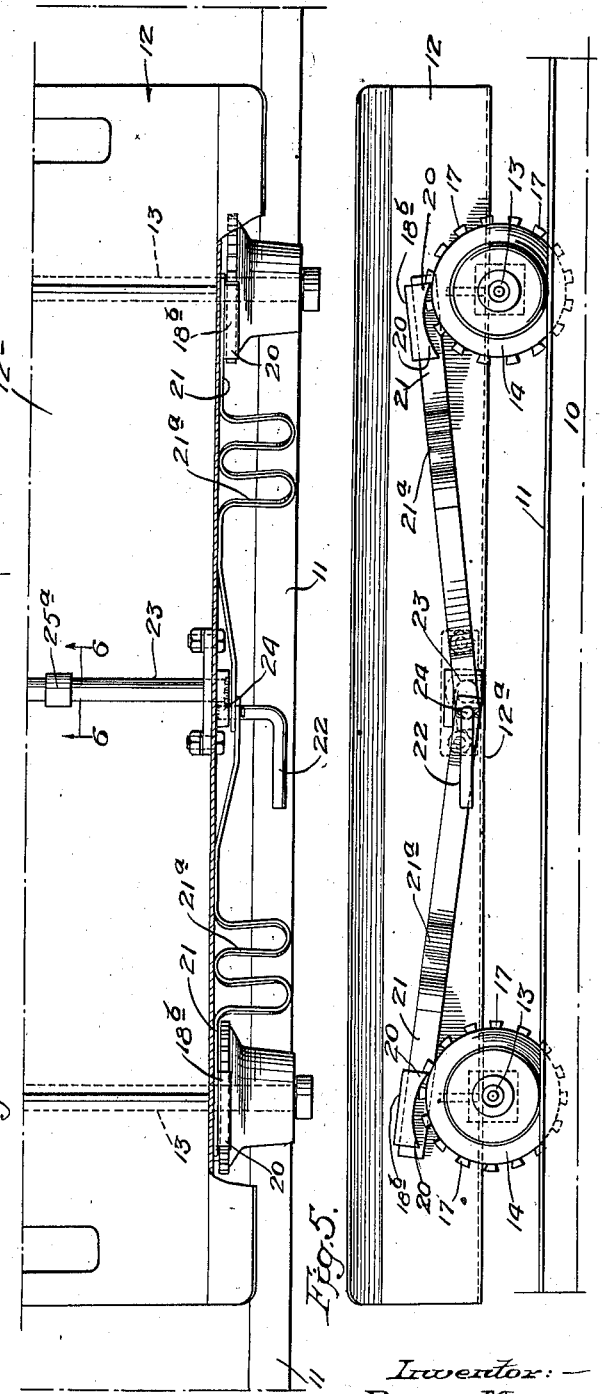

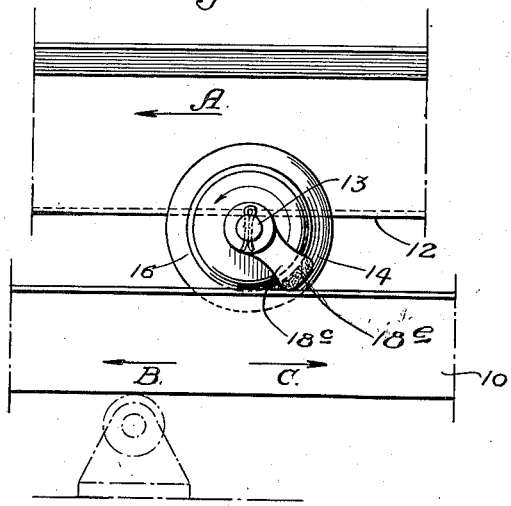
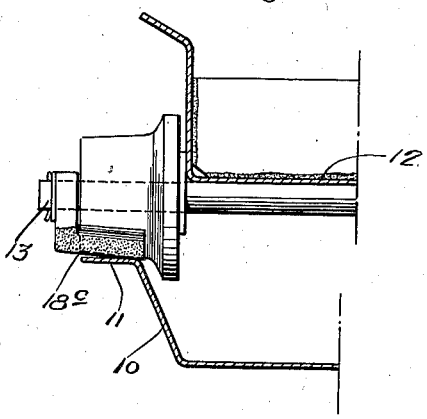
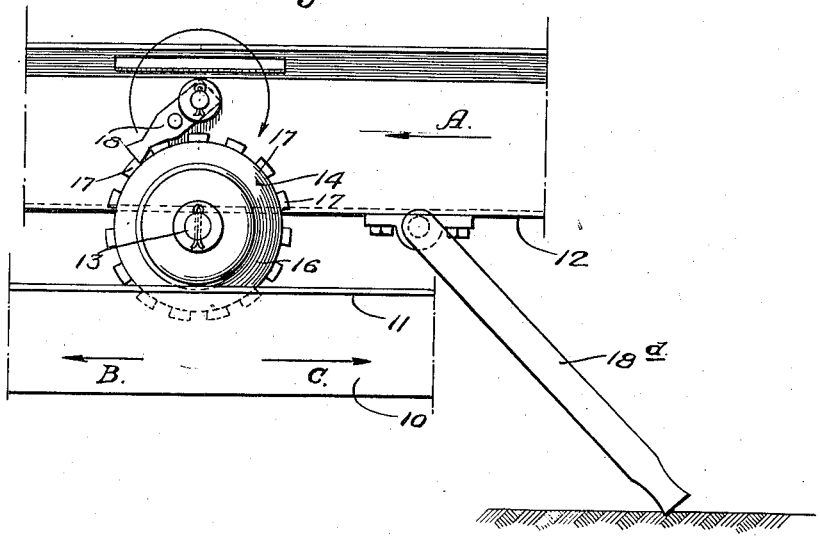

Patented Nov. 23, 1937

2,100,144

UNITED STATES PATENT OFFICE 2,100,144

CONVEYER-PROPELLED SUPPLY TRUCK FOR USE WITH SHAKING CONVEYERS

Roscoe Moore, Kingston, Pa.

Application April 4, 1936, Serial No. 72,787

14 Claims. (Cl. 198—220)

This invention relates to a conveyer-propelled supply truck for use with shaking conveyers of the type employed in mining.

As is well known to those familiar with the art, shaker conveyers are extensively employed in mines, and particularly in mines where low headings make other means of transportation difficult. Such conveyers extend from the actual mining point or working face to a suitable car-loading or discharge point and, accordingly, extend along the route of travel through which implements, roof supports, and the like must be transported. These articles, being very heavy, are difficult of manipulation in places where the roof is low and, accordingly, are often placed on supply trucks which are moved along the conveyer either manually or by means of lines. Such trucks may likewise be utilized in the transportation of passengers along difficult passages, this being an important function in event of the injury of a workman.

An important object of this invention is the provision of a truck for this purpose which may be propelled in either direction along the conveyer trough by the reciprocating action of the trough itself and which at the same time is free of connections to the trough which will prevent its immediate removal therefrom at any desired point.

A further and more specific object of the invention is the provision of a truck of this character having supporting wheels mounted upon the edges of the conveyer trough and adapted to move therealong and a body for the support of articles to be transported, wherein the wheels or body are provided with ratchet or friction mechanism which is reversible so that it may be employed to prevent movement of the truck with relation to the conveyer during either phase of the reciprocatory motion of the conveyer whereby the truck will be propelled along the conveyer.

Other objects of the invention are the provision of a structure of this character which may be readily and cheaply produced and at the same time made durable and efficient in service, and the provision of suitable ratchet or friction mechanism for accomplishing the functions above set forth.

These and other objects I attain by the construction shown in the accompanying drawings wherein, for the purpose of illustration, I have shown a preferred embodiment of my invention and wherein:

Fig. 1 is a sectional view showing a supply truck constructed in accordance with my invention mounted upon a reciprocating conveyer trough, the section being taken on the line 2—2 of Fig. 2;

Fig. 2 is a side elevation of the supply truck;

Fig. 3 is a fragmentary side elevation showing a modified form of ratchet mechanism;

Fig. 4 is a fragmentary plan view partially broken away illustrating a further modification of the ratchet mechanism;

Fig. 5 is a side elevation of the truck shown in Fig. 4;

Fig. 6 is a detail sectional view on line 6—6 of Fig. 4;

Fig. 7 is a diagrammatic illustration of the velocity cycle ordinarily employed in operation of conveyer troughs, the dotted lines illustrating the modification of this movement afforded through use of the relief springs in conjunction with the ratchet mechanism; and Figs. 8, 9 and 10 are detail views showing still further modification of the ratchet mechanism employed.

Referring now more particularly to the drawings, the numeral 10 generally designates the side walls of a shaker conveyer chute which, as in the usual construction of such chutes, are outwardly flanged at their upper ends as indicated at 11. The numeral 12 generally designates a truck body supported adjacent its opposite ends by axles 13, each of which has mounted on its opposite ends supporting wheels 14 preferably provided with anti-friction bearings 15 and having at their inner ends flanges 16 the outer faces of which are preferably angled to conform to the angle of the trough wall 10. In the form of the invention illustrated in Figures 1 and 2, the periphery of these flanges 16 is formed or provided with ratchet teeth 17 and each wheel has associated therewith a pawl mechanism 18 which is reversible in its engagement with these ratchet teeth so that rotation of the wheel in either direction may be prevented as desired.

Assuming the conveyer trough to be reciprocating and the truck in position thereon, with the pawls disposed as illustrated in solid lines in Fig. 2, the truck will obviously move in the direction of the arrow A, for as the conveyer is moving in the direction of the arrow B the wheels 14 will be locked against rotation and the truck must, accordingly, move with the conveyer. On the contrary, when the conveyer is moving in the direction of the arrow C, the wheels are free to rotate and the inertia of the body of the truck will cause the truck to remain stationary with relation to the ground, or even to continue its movement in the direction of the arrow A. It is preferable that, in the unloaded truck, the body 12 have a greater inertia than the inertia of the wheels in order that the unloaded truck may be moved from place to place upon the conveyer.

The pawl mechanism associated with the wheels may be varied through a very considerable extent, as will at once be obvious. In Fig. 3 I have illustrated reversible pawls 18—a associated with each wheel, such pawls being mounted upon a suitably guided reciprocatory bar 19 the ends of which have springs associated therewith so that the compressive forces generated when the pawl is attacked by the ratchet teeth is stored in these springs to be applied in the progressive motion. This arrangement will tend to eliminate shocks and jars in operation and to provide a smoother progressive motion. In Figs. 4 to 6 the pawl mechanisms 18—b are of the compound type, being shouldered protuberances 20 on the ends of the bars 21. These bars are, in turn, controlled by an oscillatory control lever 22 arranged at either or both sides of the truck. A spring mechanism corresponding to that just described in conjunction with Fig. 3 may be, and preferably is, provided in this structure. This may be readily accomplished by forming bars from spring steel and looping the bars as indicated at 21—a to provide spring loops therein. In event only a single control lever is employed, a shaft 23 extending across the bottom of the truck is at the opposite side of the truck connected to a stub arm 24 to which the ends of the bars 21 at that side of the truck are pivoted. Suitable locking mechanism may be provided for holding the lever 22 in adjusted positions as generally indicated at 25. This locking mechanism as at present disclosed comprises a cam 25—a having angularly related faces for holding the lever in neutral, forward and reverse positions. Rotation of the cam when any particular face is engaged may be readily prevented as, for example, by engaging the cam against the relatively resilient bottom surface 12—a of the truck body which, being formed of relatively thin metal, will yield to permit the shaft to be rotated from one position to another.

The particular advantage obtained by use of the resilient mountings for the pawl mechanisms may be better appreciated by a consideration of the velocity chart forming Figure 7, in which the line A, A', represents the speed of movement of a typical trough, and the section A diagramming the movement during the progression cycle of the trough and A' its movement in the reverse direction. It will be noted that initial movement in the reverse direction has an extremely high rate of acceleration, this rate being so high that if it is assumed that it is desired to move the truck against the direction of movement of coal on the conveyer the adhesion of the wheels to the flanges of the trough would be insufficient to prevent slipping. The springs afford a means for relieving this acceleration rate as regards its effect upon the truck and vary the acceleration rate to approximately the line $A^2$. As noted by the legends employed on the diagram, the spring contracts or loads during this initial high velocity period and then proceeds to unload as the velocity decreases so that slippage of the wheels is avoided. Obviously, any difficulty met with in transportation of the truck along the conveyer due to this abrupt reverse motion may be overcome likewise by reversing the direction of reciprocation of the trough. It may also be overcome by utilization of some such mechanism as that illustrated in Figure 10, in which a drag pawl 18—d engages the floor of the passage in which the trough is arranged.

In the form of the invention shown in Figures 8 and 9, the ratchet mechanism co-acts not with the wheels of the truck but with some other associated structure. In Figures 8 and 9 the axles 13 have pivoted thereto drag pawls 18—c which may be swung to one side or the other of the wheels and have braking engagement with the upper end of the conveyer trough wall. Such pawls may be equipped with an anti-friction face such as that suggested at 18—e.

Since the invention is obviously capable of considerable modification without departing from the spirit thereof, I do not wish to be understood as limiting myself to those constructions hereinbefore described and illustrated except as hereinafter claimed.

I claim:

1. The combination with a reciprocating trough conveyer, reciprocation of which causes movement of a conveyed material in one direction along the trough, of a truck having guided rolling engagement with the trough, and means preventing movement of the truck with relation to the trough during one phase of each cycle of reciprocation of the trough while permitting movement of the truck with relation to the trough during the other phase of each cycle.

2. The combination with a reciprocating trough conveyer, reciprocation of which causes movement of a conveyed material in one direction along the trough, of a truck having guided rolling engagement with the trough, and reversible ratchet means preventing movement of the truck with relation to the trough during one phase of each cycle of reciprocation of the trough while permitting movement of the truck with relation to the trough during the other phase of each cycle.

3. The combination with a reciprocating trough conveyer, reciprocation of which causes movement of a conveyed material in one direction along the trough, of a truck having guided rolling engagement with the trough, and means preventing movement of the truck with relation to the trough during one phase of each cycle of reciprocation of the trough while permitting movement of the truck with relation to the trough during the other phase of each cycle.

4. The combination with a reciprocating trough conveyer, reciprocation of which causes movement of a conveyed material in one direction along the trough, of a truck having guided rolling engagement with the trough, and a reversible ratchet mechanism preventing movement of the truck with relation to the trough during one phase of each cycle of reciprocation of the trough while permitting movement of the truck with relation to the trough during the other phase of each cycle.

5. The combination with a reciprocating trough conveyer having upstanding side walls, reciprocation of said trough causing movement of conveyed material in one direction along the trough, of a truck having wheels to engage the upper ends of the side walls of the trough and roll therealong, and ratchet mechanism preventing movement of the truck with relation to the trough during one phase of each cycle of reciprocation of the trough and permitting movement of the truck with relation to the trough during the other phase of said cycle.

6. The combination with a reciprocating trough conveyer, reciprocation of which causes movement of a conveyed material in one direction along the trough, of a wheeled truck having guided rolling engagement with the trough, and means preventing rotation of the wheels of the truck during one phase of each cycle of reciprocation of the trough while permitting such rotation during the other phase of each cycle.

7. The combination with a reciprocating trough conveyer, reciprocation of which causes movement of a conveyed material in one direction along the trough, of a wheeled truck having guided rolling engagement with the trough, and reversible ratchet means preventing rotation of the wheels of the truck during one phase of each cycle of reciprocation of the trough while permitting such rotation during the other phase of each cycle.

8. The combination with a reciprocating trough conveyer, reciprocation of which causes movement of a conveyed material in one direction along the trough, of a truck having guided rolling engagement with the trough, and a yieldably mounted reversible ratchet mechanism preventing movement of the truck with relation to the trough during one phase of each cycle of reciprocation of the trough while permitting movement of the truck with relation to the trough during the other phase of each cycle.

9. The combination with a reciprocating trough conveyer having upstanding side walls, reciprocation of said trough causing movement of conveyed material in one direction along the trough, of a truck having wheels to engage the upper ends of the side walls of the trough and roll therealong, and yieldably mounted ratchet mechanism preventing movement of the truck with relation to the trough during one phase of each cycle of reciprocation of the trough and permitting movement of the truck with relation to the trough during the other phase of said cycle.

10. A device as claimed in claim 5 wherein the ratchet mechanism includes a spring yielding to cushion the shock of engagement of the ratchet elements.

11. A device as claimed in claim 5 wherein the wheels of the truck are flanged and the ratchet mechanism includes teeth formed upon the periphery of the flange.

12. A device as claimed in claim 5 wherein means are provided for simultaneously reversing the ratchet mechanisms associated with the wheels.

13. A device as claimed in claim 5 wherein the pawls of the ratchet mechanism are mounted upon spring bars.

14. A device as claimed in claim 7 wherein the ratchet mechanism is yieldably mounted.

ROSCOE MOORE.